(12) United States Patent
Alfieri et al.

(10) Patent No.: US 10,196,956 B2
(45) Date of Patent: Feb. 5, 2019

(54) METHOD FOR CONTROLLING AN INJECTOR FOR INJECTING A REDUCTANT INTO AN EXHAUST SYSTEM OF AN INTERNAL COMBUSTION ENGINE

(71) Applicant: GM GLOBAL TECHNOLOGY OPERATIONS LLC, Detroit, MI (US)

(72) Inventors: Vincenzo Alfieri, Turin (IT); Giuseppe Mazzara Bologna, Nicosia (IT); Giuseppe Conte, Turin (IT); Alberto Bemporad, Lucca (IT); Daniele Bernardini, Siena (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 4 days.

(21) Appl. No.: 15/496,746

(22) Filed: Apr. 25, 2017

(65) Prior Publication Data
US 2017/0306819 A1   Oct. 26, 2017

(30) Foreign Application Priority Data
Apr. 25, 2016   (GB) .................................... 1607139.1

(51) Int. Cl.
*F01N 3/20*   (2006.01)
*F01N 9/00*   (2006.01)

(52) U.S. Cl.
CPC .............. *F01N 3/208* (2013.01); *F01N 9/00* (2013.01); *F01N 9/005* (2013.01); *F01N 2560/021* (2013.01); *F01N 2900/1812* (2013.01)

(58) Field of Classification Search
CPC .......... F01N 3/2066; F01N 3/208; F01N 9/00; F01N 9/005; F01N 2560/021;
(Continued)

(56) References Cited

U.S. PATENT DOCUMENTS 6,427,439 B1 *   8/2002   Xu .......................... F01N 3/208
                                                60/274
7,236,874 B2   6/2007   Ichihara
(Continued)

FOREIGN PATENT DOCUMENTS

WO   2008043928 A1   4/2008

OTHER PUBLICATIONS

Great Britain Patent Office, Great Britain Search Report for Great Britain Application No. 1607139.1, dated Oct. 28, 2016.

*Primary Examiner* — Mark Laurenzi
*Assistant Examiner* — Dapinder Singh
(74) *Attorney, Agent, or Firm* — Lorenz & Kopf, LLP

(57) ABSTRACT

A method is disclosed for controlling an injector for injecting a reductant into a selective catalytic reduction system of an internal combustion engine. A value of a concentration of nitrogen-oxides in the exhaust gas aftertreatment system downstream of the selective catalytic reduction system is measured, and a first difference is calculated between the measured value of the nitrogen-oxides concentration and a predetermined reference value thereof. A value of a concentration of ammonia in the exhaust gas aftertreatment system downstream of the selective catalytic reduction system is measured, and a second difference is calculated between the measured value of the ammonia concentration and a predetermined reference value thereof. A quantity of reductant to be injected by the injector is calculated as a function of the calculated first difference and second difference, and the injector is operated to inject the calculated quantity of reductant.

19 Claims, 3 Drawing Sheets

(58) Field of Classification Search
CPC ........... F01N 2560/026; F01N 2570/14; F01N 2610/02; F01N 2900/1812; F01N 2900/04; B01D 53/9409
USPC .................................. 60/286, 295, 299–301
See application file for complete search history.

(56) References Cited

U.S. PATENT DOCUMENTS

| | | |
|---|---|---|
| 9,669,822 B2 | 6/2017 | Piper et al. |
| 9,927,780 B2 | 3/2018 | Sun et al. |
| 2003/0005683 A1* | 1/2003 | Lambert ............ B01D 53/9431 60/276 |
| 2009/0288899 A1 | 11/2009 | Belloso |
| 2012/0010860 A1 | 1/2012 | Kirkling et al. |
| 2013/0219867 A1 | 8/2013 | Gady et al. |

\* cited by examiner

METHOD FOR CONTROLLING AN INJECTOR FOR INJECTING A REDUCTANT INTO AN EXHAUST SYSTEM OF AN INTERNAL COMBUSTION ENGINE

CROSS-REFERENCE TO RELATED APPLICATION

This application claims priority to Great Britain Patent Application No. 1607139.1, filed Apr. 25, 2016, which is incorporated herein by reference in its entirety.

TECHNICAL FIELD

The present disclosure pertains to a method of controlling an injector for injecting a reductant into an exhaust gas aftertreatment system of an internal combustion engine of a motor vehicle, typically a Diesel engine, equipped with at least one selective catalytic reduction catalyst.

BACKGROUND

Internal combustion engines generate drive torque from the combustion of an air and fuel mixture. The combustion process generates exhaust gas that is exhausted from the internal combustion engine to the atmosphere. The exhaust gas contains combustion by-products, such nitrogen oxides ($NO_x$), which may be treated by an exhaust gas aftertreatment system before being released to the atmosphere.

In an exemplary exhaust gas aftertreatment system, a dosing system injects a reductant (e.g. a water solution of urea) into the exhaust gas upstream of a selective catalytic reduction (SCR) catalyst. The reductant breaks down to form ammonia ($NH_3$) that is stored in the SCR catalyst. Ammonia stored in the SCR catalyst reacts with $NO_x$ to form diatomic nitrogen ($N_2$) and water, which reduces the $NO_x$ levels released to the atmosphere.

In order to minimize the emissions ensuring the maximum efficiency in NOx conversion and, at the same time, the minimum consumption and the minimum release of reductant from the SCR system to the atmosphere, a need exists of improving the control of the dose of reductant injected into the exhaust gas stream upstream of the SCR system.

SUMMARY

The present disclosure provides a method of controlling an injector for injecting a reductant into a selective catalytic reduction system of an internal combustion engine. A value of a concentration of nitrogen-oxides in an exhaust gas aftertreatment system downstream of the selective catalytic reduction system is measured, and a first difference is calculated between the measured value of the nitrogen-oxides concentration and a predetermined reference value thereof. a value of a concentration of ammonia in the exhaust gas aftertreatment system downstream of the selective catalytic reduction system is measured; a second difference is calculated between the measured value of the ammonia concentration and a predetermined reference value thereof. A quantity of reductant to be injected by the injector is calculated as a function of the calculated first difference and second difference, and the injector is operated to inject the calculated quantity of reductant.

The method may include calculating the quantity of reductant to be injected by the injector as a function of the calculated first difference and second difference in order to maximize conversion of nitrogen oxides to nitrogen using the selective catalytic reduction system and to minimize the ammonia consumed by the selective catalytic reduction system and/or released thereby to the external environment. As a result, the control of the quantity of reductant injected into the exhaust gas stream upstream of the SCR system may be improved, in particular, the NOx conversion of the SCR system may maximized and the ammonia consumed and released by the SCR system in the external environment may be contemporarily minimized.

The quantity of reductant to be injected by the injector may be calculated as a function of the calculated first difference and second difference a temperature of exhaust gas entering the selective catalytic reduction system and/or a mass flow rate of exhaust gas.

According to an embodiment of the solution, calculation of the quantity of reductant to be injected may include solving an optimization control function or problem based on the calculated first difference and second difference, wherein the optimization function subjects the calculated first difference and second differences and the quantity to be calculated to respective predetermined constraint conditions. As a result, a considerable reduction of calibration effort is required for the control of the quantity of reductant with respect to the known control methods.

According to an embodiment of the solution, calculation of the quantity of reductant to be injected may include calculating a minimum value of a quadratic performance index subjected to predetermined constraint conditions, wherein the quantity of reductant to be injected is a manipulated variable of the quadratic performance index and the first difference and second difference are, respectively, a first and a second state quantity of the quadratic performance index. As a result, the quantity of reductant to be injected may be calculated as the best (or optimal) solution among the possible solutions consistent with the constraint conditions that leads to the goal with a minimum number of control cycles.

According to an embodiment of the solution, the quadratic performance index may include a third state quantity determined by a variation of the quantity of reductant to be injected at each control cycle. As a result, too aggressive changes in the reductant injection between two consecutive control cycles are avoided, thereby allowing a smoother reductant quantity injection curve among the control cycles.

According to an embodiment of the solution, the quadratic performance index may be defined by the following equation:

$$J = \left( \sum_{k=0}^{N-1} [W_{NO_x}(NO_{x,k} - NO_{x,ref})^2 + W_{NH_3}(NH_{3,k} - NH_{3,ref})^2 + W_u(NH_{3in,k})^2 + W_{du}(\Delta RED_{in,k})^2] \right)$$

wherein $NO_{x,k}$ is the measured value of the nitrogen-oxides concentration, $NO_{x,ref}$ is the reference value of the nitrogen-oxides concentration, $NH_{3,k}$ is the measured value of the ammonia concentration, $NH_{3,ref}$ is the reference value of the ammonia concentration, $W_{NO_x}$ is a first weight factor, $W_{NH_3}$ is a second weight factor, $NH_{3in,k}$ is the quantity of the reductant to be calculated, $W_u$ is a third weight factor, $\Delta RED_{in,k}$ is the variation of the quantity of the reductant at each control cycle, $W_{du}$ is a fourth weight factor and N is a predetermined number of control cycles into a predetermined discrete-time prediction horizon. As a result, the calculation of the quantity of reductant may be computationally easy and fast by solvers using standard algorithms. Moreover, all the terms of the equation are weighted by a respective weight factor which determines the actual contribution of each term as a function of the state condition, namely the actual state conditions of the controlled aftertreatment system.

By way of example, according to an aspect of this embodiment, the method may further include determining the first weight factor, the second weight factor, the third weight factor, and the fourth weight factor of the quadratic performance index on the basis of a value of a temperature of exhaust gas entering the selective catalytic reduction system. As a result, the control strategy may modulate the trade-off of the $NO_x$ conversion efficiency of the selective catalytic reduction system against the ammonia slip downstream of the selective catalytic reduction depending on the temperature of exhaust gas entering the selective catalytic reduction system. This is a parameter that may strongly influences the $NO_x$ conversion efficiency and, can significantly impact on the ammonia storage capacity of the selective catalytic reduction system, and also strongly influence the ammonia slip.

According to an embodiment of the solution, the predetermined constraint conditions may include the condition that the quantity of the reductant to be injected must be included within an interval ranging from zero to a maximum threshold value thereof. As a result, the quantity of the reductant to be injected upstream of the selective catalytic reduction system cannot exceed a maximum value thereof in order to minimize the ammonia slip and the reductant consumption.

According to an embodiment of the solution, the predetermined constraint conditions may further include the condition that the first difference must be included within an interval ranging from zero to a maximum threshold value thereof. As a result, the control strategy may take into account the total amount of NOx, at the time of the control, exiting from the internal combustion which represents the total amount of NOx to be converted by the ammonia stored in the selective catalytic reduction system and/or injected upstream thereof.

According to an embodiment of the solution, the predetermined constraint conditions may include the condition that the second difference must be included within an interval ranging from zero to a maximum threshold value thereof. As a result, the control strategy may take into account the total amount of ammonia slipping at the tailpipe fixing a limit thereof.

According to an embodiment of the solution, the predetermined constraint conditions may further include the condition that the variation of the quantity of the reductant to be injected at each control cycle must be included within an interval ranging from a minimum negative threshold value to a maximum positive threshold value thereof. As a result, the control strategy may lead a smoother and gradual reductant injection pattern with benefit for the selective reduction system conversion and storage efficiency.

According to an embodiment of the solution, the predetermined constraint conditions may further include the condition that a quantity of ammonia stored into the selective catalytic reduction system at each control cycle must be included within an interval ranging from a minimum threshold value to a maximum threshold value thereof. As a result, the control strategy may maintain a minimum quantity of ammonia stored into the selective catalytic reduction system and, at the same time this aspect allows to smooth the injection of reductant, minimizing the reductant injection maintaining the NOx conversion efficiency of the selective catalytic reduction system.

The present solution may be also embodied in the form of a computer program product including a carrier on which the computer program is stored. In particular, the present disclosure may be embodied in the form of a control apparatus for an injector for injecting a reducing agent into a selective catalytic reduction system of an internal combustion engine, including an electronic control unit, a data carrier associated to the electronic control unit and the computer program stored in the data carrier.

Another embodiment provides an internal combustion engine including an injector for injecting a reductant into a selective catalytic reduction system, and an electronic control unit configured to: measure a value of a concentration of nitrogen-oxides in the exhaust gas aftertreatment system downstream of the selective catalytic reduction system; calculate a first difference between the measured value of the nitrogen-oxides concentration and a predetermined reference value thereof; measure a value of a concentration of ammonia in the exhaust gas aftertreatment system downstream of the selective catalytic reduction system; calculate a second difference between the measured value of the ammonia concentration and a predetermined reference value thereof; calculate a quantity of reductant to be injected into the exhaust gas aftertreatment system as a function of the calculated first difference and second difference; and operate the injector to inject the calculated quantity of reductant. In another embodiment of the solution provides an automotive system equipped with the internal combustion engine as above disclosed. As a result, the control of the quantity of reductant injected into the exhaust gas stream upstream of the SCR system may be improved, in particular, the NOx conversion of the SCR system may maximized and the ammonia consumed and released by the SCR system in the external environment may be contemporary minimized.

According to an embodiment of the solution, the electronic control unit is configured to solve an optimization control function based on the calculated first difference and second difference, wherein the optimization problem provide for subjecting the calculated first difference and second differences and the quantity to be calculated to respective predetermined constraint conditions. As a result, a considerable reduction of calibration effort is required for the control of the quantity of reductant with respect to the known control methods.

According to an embodiment of the solution, the electronic control unit is configured to calculate a minimum value of a quadratic performance index subjected to predetermined constraint conditions, wherein the quantity of reductant to be injected is a manipulated variable of the quadratic performance index and the first difference and second difference are, respectively, a first and a second state quantity of the quadratic performance index. As a result, the quantity of reductant to be injected may be calculated as the best solution among the possible solutions consistent with the constraint conditions that leads to the goal with a minimum number of control cycles.

According to an embodiment of the solution, the quadratic performance index may include a third state quantity determined by a variation of the quantity of reductant to be injected at each control cycle. As a result, too aggressive changes in the reductant injection between two consecutive control cycles are avoided, thereby allowing a smoother reductant quantity injection curve among the control cycles.

According to an embodiment of the solution, the quadratic performance index may be defined by the following equation:

$$J = \left( \sum_{k=0}^{N-1} [W_{NO_x}(NO_{x,k} - NO_{x,ref})^2 + W_{NH_3}(NH_{3,k} - NH_{3,ref})^2 + W_u(NH_{3in,k})^2 + W_{du}(\Delta RED_{in,k})^2] \right)$$

wherein $NO_{x,k}$ is the measured value of the nitrogen-oxides concentration, $NO_{x,ref}$ is the reference value of the nitrogen-oxides concentration, $NH_{3,k}$ is the measured value of the ammonia concentration, $NH_{3,ref}$ is the reference value of the ammonia concentration, $W_{NO_x}$ is a first weight factor, $W_{NH_3}$ is a second weight factor, $NH_{3in,k}$ is the quantity of the reductant to be calculated, $W_u$ is a third weight factor, $\Delta RED_{in,k}$ is the variation of the quantity of the reductant at each control cycle, $W_{du}$ is a fourth weight factor and N is a predetermined number of control cycles into a predetermined discrete-time prediction horizon. As a result, the calculation of the quantity of reductant may be computationally easy and fast by solvers using standard algorithms, moreover all the terms of the equation are weighted by a respective weight factor which determines the actual contribute of each term as a function of the state condition, namely the actual state conditions of the controlled exhaust gas aftertreatment system.

By way of example, according to an aspect of this embodiment, the electronic control unit is configured to determine the first weight factor, the second weight factor, the third weight factor, and the fourth weight factor of the quadratic performance index on the basis of a value of a temperature of exhaust gas entering the selective catalytic reduction system. As a result, the control strategy may modulate the trade-off of the $NO_x$ conversion efficiency of the selective catalytic reduction system against the ammonia slip downstream of the selective catalytic reduction depending on the temperature of exhaust gas entering the selective catalytic reduction system. This parameter may strongly influence the $NO_x$ conversion efficiency and, impact on the ammonia storage capacity of the selective catalytic reduction system, as well as strongly influence the ammonia slip.

According to an embodiment of the solution, the predetermined constraint conditions may include the condition that the quantity of the reductant to be injected must be included within an interval ranging from zero to a maximum threshold value thereof. As a result, the quantity of the reductant to be injected upstream of the selective catalytic reduction system cannot exceed a maximum value thereof in order to minimize the ammonia slip and the reductant consumption.

According to an embodiment of the solution, the predetermined constraint conditions may further include the condition that the first difference must be included within an interval ranging from zero to a maximum threshold value thereof. As a result, the control strategy may take into account the total amount of NOx, at the time of the control, exiting from the internal combustion which represents the total amount of NOx to be converted by the ammonia stored in the selective catalytic reduction system and/or injected upstream thereof.

According to an embodiment of the solution, the predetermined constraint conditions may include the condition that the second difference must be included within an interval ranging from zero to a maximum threshold value thereof. As a result, the control strategy may take into account the total amount of ammonia slipping at the tailpipe fixing a limit thereof.

According to an embodiment of the solution, the predetermined constraint conditions may further include the condition that the variation of the quantity of the reductant to be injected at each control cycle must be included within an interval ranging from a minimum negative threshold value to a maximum positive threshold value thereof. As a result, the control strategy may lead a smoother and gradual reductant injection pattern with benefit for the selective reduction system conversion and storage efficiency.

According to an embodiment of the solution, the predetermined constraint conditions may further include the condition that a quantity of ammonia stored into the selective catalytic reduction system at each control cycle must be included within an interval ranging from a minimum threshold value to a maximum threshold value thereof. As a result, the control strategy may maintain a minimum quantity of ammonia stored into the selective catalytic reduction system and, at the same time this aspect allows to smooth the injection of reductant, minimizing the reductant injection maintaining the NOx conversion efficiency of the selective catalytic reduction system.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
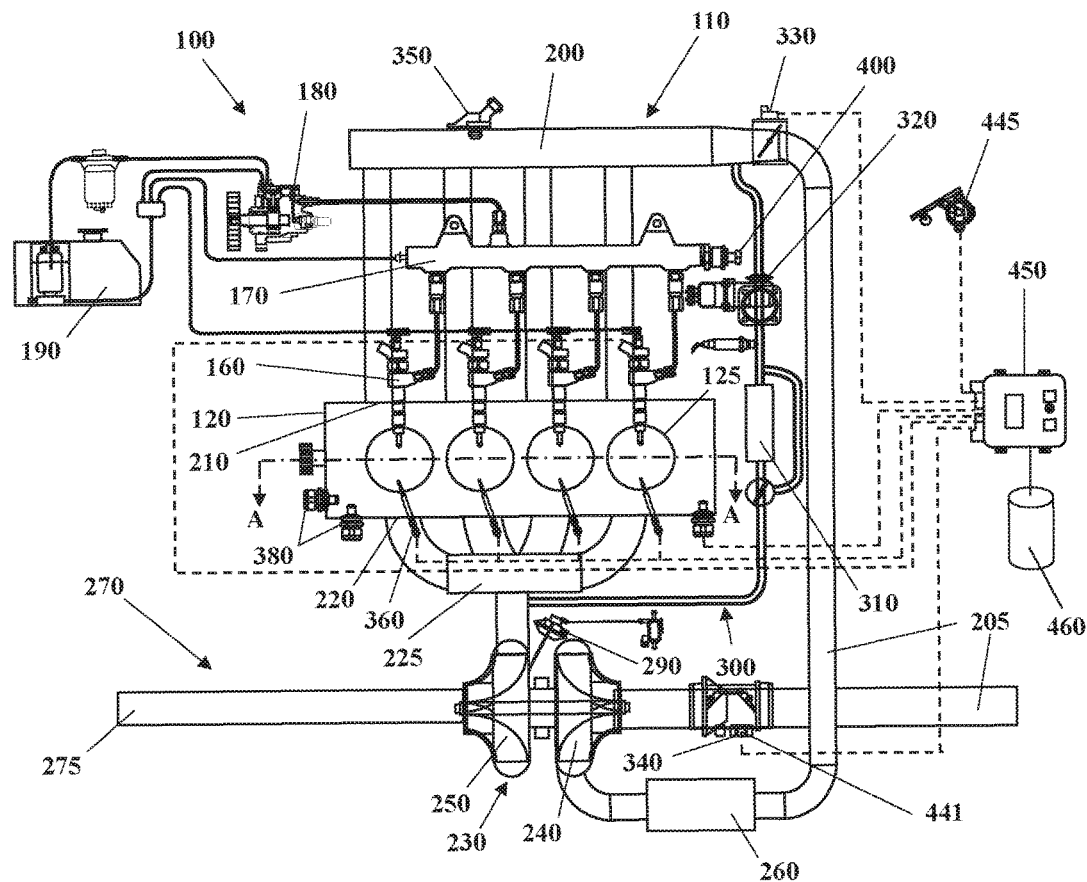
FIG. 1 shows an automotive system.
Figure 2:
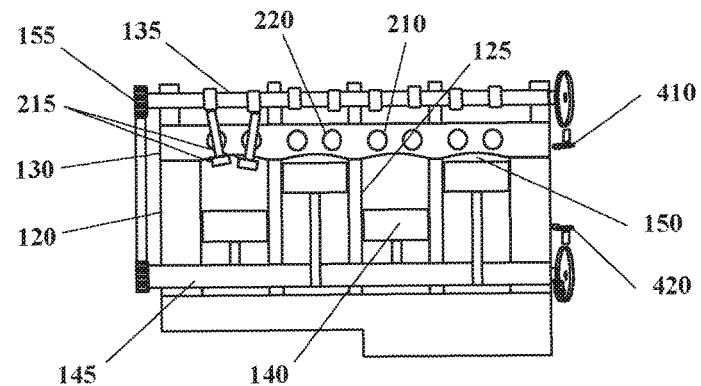
FIG. 2 is a cross-section of an internal combustion engine belonging to the automotive system of FIG. 1.
Figure 3:
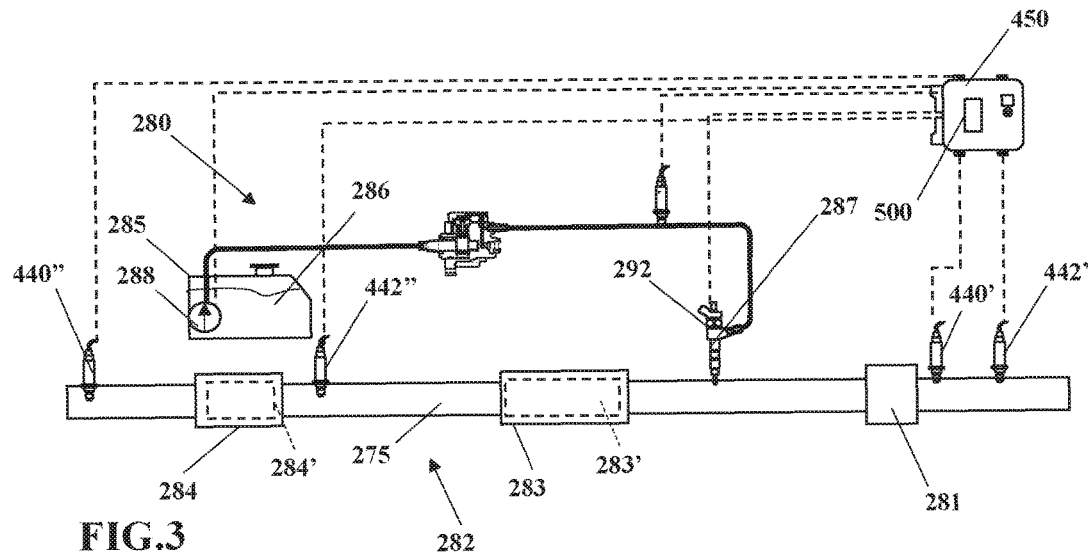
FIG. 3 is a schematic representation of an SCR system belonging to the automotive system of FIG. 1.
Figure 4:
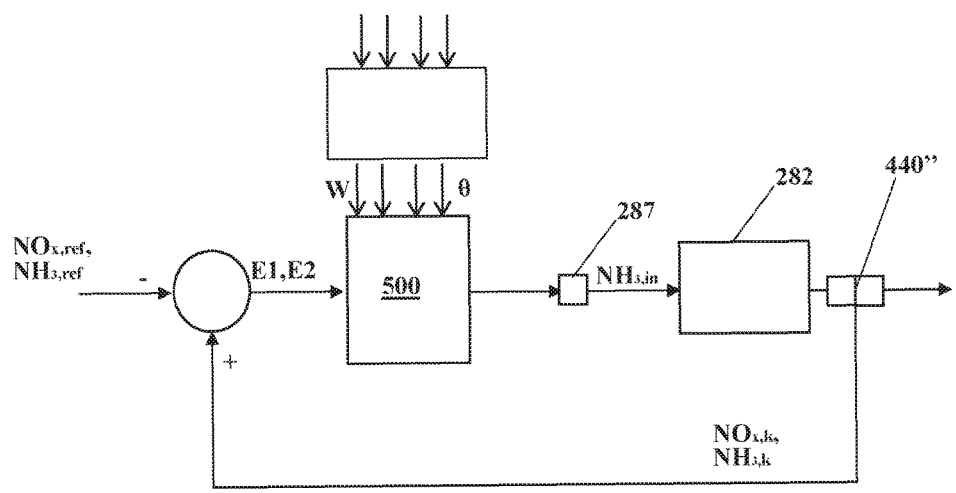
FIG. 4 is a flowchart that represents a method of controlling the reductant injector of the SCR system according to an embodiment of the present disclosure.
Figure 5:
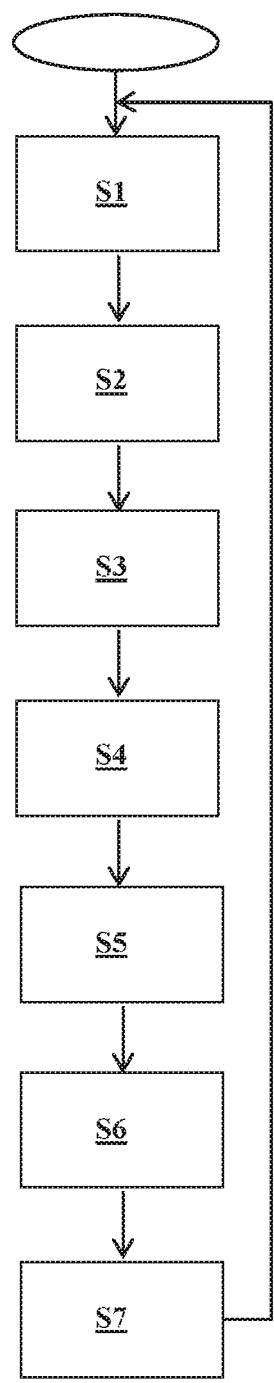
FIG. 5 is a further flowchart that represents a method of controlling the reductant injector of the SCR system according to an embodiment of the present disclosure.

Some embodiments may include an automotive system 100, as shown in FIGS. 1 and 2, that includes an internal combustion engine (ICE) 110 having a cylinder block 120 defining at least one cylinder 125 having a piston 140 coupled to rotate a crankshaft 145. A cylinder head 130 cooperates with the piston 140 to define a combustion chamber 150.

A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. The fuel injection system with the above disclosed components is known as common rail Diesel injection system or CR injection system. The main advantage of the CR injection system is the ability to inject the correct amounts of fuel at exactly the right moment due to the high pressure in the system and the electromagnetically controlled injectors. This implies lower fuel consumption and fewer emissions.

Each of the cylinders 125 has at least two valves 215, actuated by a camshaft 135 rotating in time with the crankshaft 145. The valves 215 selectively allow air into the combustion chamber 150 from the intake port 210 and alternately allow exhaust gases to exit through an exhaust port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle valve 330 may be provided to regulate the flow of air into the intake manifold 200. In still other embodiments, a forced air system such as a turbocharger 230, having a compressor 240 rotationally coupled to a turbine 250, may be provided. Rotation of the compressor 240 increases the pressure and temperature of the air in the air intake duct 205 and intake manifold 200. An intercooler 260 disposed in the air intake duct 205 may reduce the temperature of the air.

The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust gas aftertreatment system 270. This example shows a variable geometry turbine (VGT) 250 with a VGT actuator 255 arranged to move the vanes to alter the flow of the exhaust gases through the turbine 250.

The exhaust gas aftertreatment system 270 may include an exhaust gas line 275 having one or more exhaust gas aftertreatment devices 280. The aftertreatment devices 280 may be any device configured to change the composition of the exhaust gases. Some examples of aftertreatment devices 280 include, but are not limited to, catalytic converters (two and three way), oxidation catalysts, for example a Diesel Oxidation Catalyst (DOC) 281, a lean NOx trap (LNT), hydrocarbon adsorbers, a reductant storage device, such as a selective catalytic reduction (SCR) system, and particulate filters (DPF). By way of example, the SCR system 282 may include a single SCR catalyst downstream of the DOC 281. The single SCR catalyst may be a close-coupled selective catalytic reduction catalyst on filter (SCRoF), i.e., the particulate filter with an SCR coating.

By way of an alternative example, the SCR system 282 may be a multi-brick SCR system, which includes a first selective catalytic reduction (SCR) catalyst 283 and a second selective catalytic reduction (SCR) catalyst 284. The exhaust gas line 275, and for example the DOC 281, provides fluid communication between the exhaust manifold 225 and the first SCR catalyst 283 such that the exhaust gas line 275, through the DOC 281, convey exhaust gas from the ICE 110 to the first SCR catalyst 283. The exhaust gas line 275 defines a passage that provides fluid communication between the first SCR catalyst 283 and the second SCR catalyst 284. The first SCR catalyst 283 is located upstream of the second SCR catalyst 284 in the exhaust gas line 275. In the embodiment depicted, the first SCR catalyst 283 may be a close-coupled selective catalytic reduction catalyst on filter (SCRoF), i.e., the particulate filter with an SCR coating. The second SCR catalyst 284 may be an underfloor selective catalytic reduction catalyst (SCR U/F).

The SCR system 282 may also include an $NH_3$ trap (ROC) located downstream of the single SCR catalyst or downstream of the second SCR catalyst 284, which is configured to block the ammonia slipping from the first SCR catalyst and/or the second SCR catalyst 284. The SCR system 282 includes a tank 285 for storing a reductant 286, such as an aqueous urea solution (urea-water solution HWL) or urea that is stored in the tank 285. A reductant injector 287 is configured to inject the reductant 286 from the tank 285 into the exhaust gas line 274 upstream of the first SCR catalyst 283.

Due to the high exhaust-gas temperatures at this location in the exhaust gas line 275, the aqueous water solution of urea is thermolytically degraded, a process by which it releases an actual reductant, namely, ammonia ($NH_3$). In particular, at temperatures above 180° C., the urea begins to undergo hydrolysis and thermal decomposition resulting in the production of ammonia. The resulting mixture including urea/ammonia and exhaust gases then passes to the first SCR catalyst 283 where the ammonia reacts with NOx gases to form nitrogen gas and water.

A pump 288 may be employed to let the reductant 286 (i.e. aqueous water solution of urea or urea) flow from the tank 285 to the reductant injector 287. Optionally, treatment means that promote the homogenization and/or the degradation of the urea can also be present in the exhaust pipe 275 between the reductant injector 287 and the first SCR catalyst 283. The released reductant (i.e. ammonia) is stored in a first catalytic substrate 283' of the first SCR catalyst 283 and/or in a second catalytic substrate 284' of the second SCR catalyst 284, or else it is directly catalytically converted there with the nitrogen oxides of the exhaust gas of the ICE 110, whereby these oxides are then reduced to form nitrogen $N_2$.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow, pressure, temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an oxygen sensor, for example an Universal Exhaust Gas Oxygen (UEGO) sensor or a lambda sensor or a nitrogen oxides sensor and an accelerator pedal position sensor 445.

The sensors include also NOx sensors configured to determine the concentration and/or the amount of NOx (oxides of nitrogen) in the exhaust gas, e.g. in parts per million. For example, a first NOx sensor 440' may be disposed in the exhaust gas line 275 upstream of the first SCR catalyst 283. A second NOx sensor 440" is disposed in the exhaust gas line 275, for example downstream of the second SCR catalyst 284 (upstream of the $NH_3$ trap). The sensors may include also a sensor configured to determine the concentration and/or the amount of $NH_3$ (ammonia) in the exhaust gas, for instance, the sensor may be disposed in the exhaust gas line 275 downstream of the second SCR catalyst 284 (upstream of the $NH_3$ trap).

According to the embodiment depicted, the second NOx sensor 440" may be a sensor suitable to be cross-sensitive to the reductant, such as ammonia (NH$_3$), and may be used to detect both the NOx concentration (and/or the amount dosed over a time interval) and the NH$_3$ concentration (and/or the amount dosed over a time interval). The mass flow rate of air flowing into the intake manifold 200 is measured using a mass air flow (MAF) sensor 441.

A first exhaust gas temperature sensor 442' is disposed at or near an inlet of the first SCR catalyst 283, e.g., in the exhaust gas line 275 upstream of the first SCR catalyst 283. The ECU 450 may be configured to estimate the temperature of the first catalytic substrate 283' disposed in the first SCR catalyst 283, namely a ceramic coated substrate, for example fabricated from cordierite material, and having a multiplicity of flowthrough passageways that are coated with washcoat and catalytic materials to store reductant (i.e. ammonia) for reacting with NOx molecules present in the exhaust gas feed stream. In particular, the ECU 450 may estimate the temperature of the catalytic substrate 283' based on the temperature of exhaust gas entering the first SCR catalyst 283 (measured by the first exhaust gas temperature sensor 442') and a mass flow rate of exhaust gas.

The ECU 450 is configured to determine the mass flow rate of exhaust gas from the ICE 110 through the exhaust gas aftertreatment system 270. By way of an example, the ECU 450 may determine a mass flow rate of exhaust gas from the ICE 110 based on a mass flow rate of air entering the ICE 110 and a fueling rate of the ICE 110. To do so, the ECU 450 may receive the mass flow rate of air from the MAF sensor 441 and the fueling rate from a fuel meter that determines mass flow rate of fuel through the fuel rail 170. The mass flow rate of exhaust gas may be based on (or equal to) a sum of a mass flow rate of air entering the ICE 110 and a fueling rate of the ICE 110.

The temperature of each SCR catalyst (namely of the catalytic substrates thereof) affects the efficiency of reactions within the SCR catalyst that reduce nitrogen oxide and affects the ability of the SCR catalyst to store reductant (i.e. ammonia). When the temperature of the SCR catalyst is low, such as less than 144 degrees Celsius (° C.), the efficiency of reactions that reduce nitrogen oxide within the SCR catalyst approaches zero. Thus, even if the SCR catalyst contains ammonia, the ammonia does not react with and reduce nitrogen oxide. When the temperature of the SCR catalyst is high, such as greater than 400° C., the SCR catalyst is unable to store ammonia.

The ECU 450 is configured to determine a nitrogen oxide concentration (or amount) in the exhaust gas upstream of the first SCR catalyst 283. The ECU 450 may determine the nitrogen oxide concentration (or amount) entering the first SCR catalyst 283 based on input from the NOx sensor, for example the first NOx sensor 440'.

Furthermore, the ECU 450 may generate output signals to various control devices that are arranged to control the operation of the ICE 110, including, but not limited to, the fuel injector 160, the throttle valve 330, the EGR Valve 320, the VGT actuator 255, the cam phaser 155, the pump 288 and the reductant injector 287. Note, dashed lines are used to indicate communication between the ECU 450 and the various sensors and devices, but some are omitted for clarity.

Turning now to the ECU 450, this apparatus may include a digital central processing unit (CPU 460) in communication with a memory system and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulated technique such as QPSK for digital data, such that binary data representing the computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in a motor vehicle.

An electronic controller, namely the ECU 450, is operatively connected to the reductant injector 287 for controlling a quantity of reductant 286 that is injected by the reductant injector 287. In particular, the ECU 450 may control the quantity of reductant 286 that is injected by the reductant injector 287 by controlling a pressure of the reductant 286 transmitted by the pump 288 to the reductant injector 287 and a time of operation of the reductant injector 287. In practice, the ECU 450 actuates the reductant injector 287 to inject a quantity of reductant 286 corresponding to a requested quantity thereof.

The ECU 450 is configured to cyclically control and determine, according to a multivariable model-based control, the requested quantity of reductant 286 to be injected by the reductant injector 287 in order to maximize NOx conversion across the SCR system 282 and minimize ammonia slip in the external environment. To do so, the ECU 450 is configured to estimate (block 51) the current state of the SCR system 282. In particular, the ECU 450 may be configured to determine (estimate) a first amount of reductant (i.e. ammonia) stored in the SCR system 282 based on the mass flow rate of exhaust gas (determined as above disclosed), the nitrogen oxide concentration (or amount) entering the first SCR catalyst 283 (determined as above disclosed), and the temperature of exhaust gas entering the first SCR catalyst 283. The temperature of exhaust gas entering the first SCR catalyst 283 may be measured by the first exhaust gas temperature sensor 442' or otherwise estimated according to another estimation method known in the art.

This first amount may be stored in the memory system and used as an initial value of the control cycles suitable to control the operation of the reductant injector 287. Starting from the first amount, at the control cycle k, the ECU 450 is configured to predict an optimal quantity of reductant 286 to be injected by the reductant injector 287 at each following control cycle k+1, in order to maximize NOx conversion across the SCR system 28 and minimize ammonia slip in the external environment.

In particular, the ECU 450 is configured to measure (block S2), at each control cycle k, a value $NO_{x,k}$ of a concentration (or amount) of nitrogen-oxides ($NO_x$) in the exhaust gas downstream of the second SCR catalyst 284 of the SCR system 282, for instance, by the second NOx sensor 440". At the same sampling time (or control cycle k), the ECU 450 is configured to measure (block S3) a value $NH_{3,k}$ of a concentration (or amount) of ammonia in the exhaust gas downstream of the second SCR catalyst 284 of the SCR system 282, for instance, by the same second NOx sensor 440".

The ECU 450 is, then, configured to calculate (block S4) a first difference (E1) between the measured value $NO_{x,k}$ of the $NO_x$ concentration and a predetermined reference value $NO_{x,ref}$ thereof. The predetermined reference value $NO_{x,ref}$ of the $NO_x$ concentration may be a value pre-determined during experimental activities and stored in the memory system. By way of an example, the predetermined reference value $NO_{x,ref}$ of the $NO_x$ concentration may be set as equal to zero. In this case, the first difference (E1) may be calculated as follow:

$$E1 = NO_{x,k} - NO_{x,ref} \text{ that in the example is } E1 = NO_{x,k}.$$

The ECU 450 is, then, configured to calculate (block S5) a second difference (E2) between the measured value $NH_{3,k}$ of the $NH_3$ concentration and a predetermined reference value $NH_{3,ref}$ thereof. The predetermined reference value $NH_{3,ref}$ of the $NH_3$ concentration may be a value pre-determined during experimental activities and stored in the memory system. By way of an example, the predetermined reference value $NH_{3,ref}$ of the $NH_3$ concentration may be set as equal to zero. In this case, the second difference (E2) may be calculated as follow:

$$E2 = NH_{3,k} - NH_{3,ref} \text{ that in the example is } E2 = NH_{3,k}.$$

Knowing the first difference (E1) and the second difference (E2), the ECU 450 may be configured to calculate (block S6) an optimal quantity $NH_{3,in}$ of reductant 286 to be injected by the reductant injector 287 as a function of the calculated first difference (E1) and second difference (E2).

For instance, the calculated first difference (E1) and second difference (E2) may be input to a feedback multi-input controller or control module 500, which may be embedded in the ECU 450, and outputs an optimal quantity $NH_{3,in}$ of reductant 286 to be injected by the reductant injector 287, in order to minimize both the first difference (E1) and the second difference (E2). By way of an example, the controller 500 is configured to calculate the optimal quantity $NH_{3,in}$ of reductant 286 to be injected by the reductant injector 287 as a function of the calculated first difference (E1) and second difference (E2).

Once the optimal quantity $NH_{3,in}$ at the control cycle k is calculated, the ECU 450 is configured to operate (block S7) the reductant injector 287 to inject the calculated optimal quantity $NH_{3,in}$ of reductant 286. The controller 500 may be configured to calculate, at each control cycle k, the optimal quantity $NH_{3,in}$ of reductant 286 to be injected at the subsequent control cycle k+1, as a solution of an optimization control function or problem based on the calculated first difference (E1) and second difference (E2), wherein the optimization control function provide for subjecting the calculated first difference (E1) and second differences E2 and the optimal quantity of reductant 286 to be calculated to respective predetermined constraint conditions, as disclosed hereinafter.

In particular, the optimization control function may be a finite-time horizon discrete-time optimization control function. An example of such optimization control function is to find the optimal quantity $NH_{3,in}$, on a predetermined finite prediction horizon ($t_0$, T), which minimizes a cost function $J = J(NO_{x,k}, NH_{3,k}, \Delta RED_{in,k}, NH_{3,in})$, such as a quadratic performance index, subjected to predetermined constraint conditions. The cost function of the optimization control function is a function of a manipulated variable, namely the optimal quantity $NH_{3,in}$, and of one or more state quantities, namely at least the first difference (E1) and the second difference (E2). The predetermined constraint conditions are related to the same manipulated variable and state quantities.

The cost function J may be a weighted sum of various penalties, for example, a sum of squared 2nd norms of state quantities or tracking errors (such as the first difference (E1) and the second difference (E2) and others) over the finite prediction horizon, sum of squared 2nd norms of a quantity of reductant 286 to be injected by the operation of the reductant injector 287 (such as the optimal quantity $NH_{3,in}$), and so on. Constraints may include limits for the operation (reductant quantities to be injected, time of operation or other . . . ) of the reductant injector 287 and for various variables over the finite prediction horizon ($t_0$, T). In particular, the state quantities may include a first state quantity that is the first difference (E1), a second state quantity that is the second difference (E2) and a third state quantity that is a variation of the optimal quantity $NH_{3,in}$ to be injected by the reductant injector 287 at each control cycle k.

The controller 500 may be programmed as a solver configured to solve the formulated optimization control function according to an appropriate calculation algorithm. For instance, solvers for fast optimization control functions may be based on an on-line solution or explicit solution of a parametric optimization problem. The on-line solvers may be based on active set (standard formulation, gradient projection, and so forth), interior point, and so on. The explicit solution may be based on multi-parametric approach, primal-dual feasibility approach, and so on. By way of example, the quadratic performance index J is defined by the following equation:

$$J = \left( \sum_{k=0}^{N-1} [W_{NO_x}(NO_{x,k} - NO_{x,ref})^2 + W_{NH_3}(NH_{3,k} - NH_{3,ref})^2 + W_u(NH_{3in,k})^2 + W_{du}(\Delta RED_{in,k})^2] \right)$$

wherein $NO_{x,k}$ is the measured value of the nitrogen-oxides concentration, $NO_{x,ref}$ is the reference value of the nitrogen-oxides concentration, $NH_{3,k}$ is the measured value of the ammonia concentration, $NH_{3,ref}$ is the reference value of the ammonia concentration, $W_{NO_x}$ is a first weight factor, $W_{NH_3}$ is a second weight factor, $NH_{3in,k}$ is the quantity of the reductant to be calculated, $W_u$ is a third weight factor, $\Delta RED_{in,k}$ is the variation of the quantity of the reductant at each control cycle, $W_{du}$ is a fourth weight factor and N is a predetermined number of control cycles into a predetermined discrete-time prediction horizon $(t_0, T)$.

The ECU 450 may be configured to determine each of the weight factors of the quadratic performance index J, namely the first weight factor $W_{NO_x}$, the second weight factor $W_{NH_3}$, the third weight factor $W_u$, and the fourth weight factor $W_{du}$, on the basis of a current value $t_k$ of a temperature of exhaust gas entering the SCR system 282, namely entering the first SCR catalyst 283 of the SCR system 282. For instance, the current value $t_k$ of the temperature of exhaust gas may be measured, at the time of the control cycle k, by the by the first exhaust gas temperature sensor 442'. For example, the ECU 450 may use the current value $t_k$ of the temperature of exhaust gas as input of a plurality of maps, namely four maps (one for each weight factor), each of which yields as output a corresponding value of the respective weight factor. Such maps may be determined with experimental activities and then stored in the memory system.

The predetermined constraint conditions of the optimization control function above disclosed include a constraint condition on the optimal quantity $NH_{3in,k}$ of the reductant 286, wherein such constraint condition provide for the optimal quantity $NH_{3in,k}$ of the reductant 286 to be included within an interval ranging from zero to a maximum threshold value $NH_{3in,max}$ thereof, namely $0 < NH_{3in,k} < NH_{3in,max}$.

The ECU 450 may be configured to determine the maximum threshold value $NH_{3in,max}$ on the basis of values of the mass flow rate of exhaust gas (determined as above disclosed at the current cycle k), the temperature of exhaust gas entering the first SCR catalyst 283 of the SCR system 282, for example measured (e.g., by the first exhaust gas temperature sensor 442') as disclosed above at the current cycle k, the $NO_x$ concentration (or amount) upstream of the first SCR catalyst 283 of the SCR system 282, for instance measured by the first NOx sensor 440' as above disclosed at the current cycle k, and the amount of reductant 286 injected at the previous cycle k-1 (based on the first amount of reductant 286, estimated as above disclosed, updated by the summation of the optimal quantities $NH_{3in,k}$ injected from the first control cycle to the control cycle k-1 previous to the current cycle k or otherwise measured or estimated.

By way of example, the maximum threshold value $NH_{3in,max}$ may be provided as an output of a pre-calibrated map which receives as inputs the mass flow rate of exhaust gas, the $NO_x$ concentration and the temperature of exhaust gas entering the first SCR catalyst 283 and the amount of reductant injected upstream of the first SCR catalyst 283. This map may be pre-determined during experimental activities and stored in the memory system. As an alternative, the maximum threshold value $NH_{3in,max}$ may be provided as a maximum value (e.g. in grams per second) of reductant 286 that the reductant injector 287 may inject; this value may be retrieved by the data sheets of the supplier of the reductant injector 287 and stored in the memory system.

The predetermined constraint conditions of the optimization control function above disclosed further include a constraint condition on the first difference (E1), wherein such constraint condition provides for the first difference (E1) to be included within an interval ranging from zero to a maximum threshold value $NO_{x,max} - NO_{x,ref}$ thereof, namely $0 < NO_{x,k} - NO_{x,ref} < NO_{x,max} - NO_{x,ref}$.

The ECU 450 may be configured to determine the maximum threshold value $NO_{x,max} - NO_{x,ref}$ on the basis of the $NO_x$ concentration (or amount) upstream of the first SCR catalyst 283 of the SCR system 282, for instance measured by the first $NO_x$ sensor 440' as above disclosed at the current cycle k. By way of example, the maximum threshold value $NO_{x,max} - NO_{x,ref}$ may be set as equal to the difference between the $NO_x$ concentration (or amount) upstream of the first SCR catalyst 283 of the SCR system 282 and the reference value of the $NO_x$ concentration. This map may be pre-determined during experimental activities and stored in the memory system.

The predetermined constraint conditions of the optimization control function above disclosed may include a constraint condition on the second difference (E2), wherein such constraint condition provides for the second difference (E2) to be included within an interval ranging from zero to a maximum threshold value $NH_{3,max} - NH_{3,ref}$ thereof, namely $0 < NH_{3,k} - NH_{3,ref} < NH_{3,max} - NH_{3,ref}$. By way of example, the maximum threshold value $NH_{3,max} - NH_{3,ref}$ may be set equal to the difference between a maximum ammonia storage capacity $NH_{3,max}$ of the SCR system 282, and the reference value $NH_{3,ref}$ of the $NH_3$ concentration. The maximum ammonia storage capacity $NH_{3,max}$ may be calculated as the sum of the maximum ammonia storage capacities of each SCR catalyst of the SCR system 282 (for instance, the first SCR catalyst 283 and the second SCR catalyst 284), wherein each ammonia storage capacity may be a nominal value provided by the data sheets of the supplier of the SCR catalysts. As an alternative, the maximum threshold value $NH_{3,max} - NH_{3,ref}$ may be predetermined during experimental activities and stored in the memory system. The maximum ammonia storage capacity of the SCR system 282 may be determined on the basis of the temperature of the exhaust gas entering the respective SCR catalyst, namely the first SCR catalyst 283 and the second SCR catalyst 284.

The predetermined constraint conditions of the optimization control function above disclosed may further include a constraint condition on the variation of the optimal quantity $\Delta RED_{in,k}$ of the reductant 286 at each control cycle k, wherein such constraint condition provides for the variation of the optimal quantity $\Delta RED_{in,k}$ of the reductant 286 to be included within an interval ranging from a minimum negative threshold value to a maximum positive threshold value thereof, wherein for example the maximum positive threshold value and the minimum negative threshold value are equal in magnitude, namely $-\Delta RED_{in,max} < \Delta RED_{in,k} < +\Delta RED_{in,max}$. The maximum positive threshold value and the minimum negative threshold value may be predetermined during experimental activities and stored in the memory system, in such a way to avoid too aggressive changes in the injection of reductant 286 between two consecutive control cycles.

The predetermined constraint conditions of the optimization control function above disclosed may further include a constraint condition on a quantity of ammonia $\theta_k$ stored into the SCR system 282, namely the first SCR catalyst 283 and the second SCR catalyst 284, at each control cycle k, wherein such constraint condition provides for the quantity of ammonia $\theta_k$ stored into the SCR system 282 at each control cycle k to be included within an interval ranging from a minimum threshold value $\theta_{min}$ to a maximum threshold value thereof $\theta_{max}$, namely $\theta_{min} < \theta_k < \theta_{max}$. In particular, the quantity of ammonia $\theta_k$ stored into the SCR system 282 may be calculated as a function of the optimal quantity $NH_{3,in}$ which solves the optimization control function above disclosed. The minimum threshold value $\theta_{min}$ and the maximum threshold value $\theta_{max}$ of the quantity of ammonia $\theta_k$ stored into the SCR system 282 may be predetermined during experimental activities and stored in the memory system, in such a way to avoid too much empting of the SCR system 282 and an excess of ammonia stored into the SCR system 282.

Among the calculated optimal quantities $NH_{3,in}$ that minimizes the quadratic performance index J, the solver calculates respective values of quantity of ammonia $\theta_k$ stored into the SCR system 282 and chooses the one (or more) that meets the fourth constraint condition. In practice, the optimal quantity $NH_{3,in}$ used to operate the reductant injector 287, at block S7, is the one which minimize the cost function J and complies with the first, the second and the third constraint conditions and corresponds to the quantity of ammonia $\theta_k$ stored into the SCR system 282 which complies with the fourth constraint condition.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of controlling a reductant injector for a selective catalytic reduction system in an exhaust gas aftertreatment system of an internal combustion engine comprising:
   measuring a value of nitrogen-oxide concentration in an exhaust gas downstream of the selective catalytic reduction system;
   calculating a first difference between the measured value of nitrogen-oxide concentration and a first predetermined reference value;
   measuring a value of ammonia concentration in the exhaust gas downstream of the selective catalytic reduction system;
   calculating a second difference between the measured value of the ammonia concentration and a second predetermined reference value;
   calculating a quantity of reductant to be injected by the injector as a function of the first difference and second difference, including:
      solving an optimization control function based on the first difference and second difference, the optimization control function subjecting the first difference and second differences and the quantity of reductant to respective predetermined constraint conditions; and
      calculating a minimum value of a quadratic performance index subjected to predetermined constraint conditions, wherein the quantity of reductant is a manipulated variable of the quadratic performance index and the first difference and second difference are, respectively, a first and a second state quantity of the quadratic performance index; and
   controlling the injector using the calculated quantity for injecting a reductant into the selective catalytic reduction system.

2. The method of claim 1, wherein the quadratic performance index comprises a third state quantity determined by a variation of the quantity of reductant at each control cycle.

3. The method according to claim 2, wherein the predetermined constraint conditions comprise the condition that the variation of the quantity of the reductant at each control cycle is within an interval ranging from a minimum negative threshold value to a maximum positive threshold value thereof.

4. The method of claim 2, wherein the quadratic performance index is defined by the following equation:

$$J = \left( \sum_{k=0}^{N-1} [W_{NO_x}(NO_{x,k} - NO_{x,ref})^2 + W_{NH_3}(NH_{3,k} - NH_{3,ref})^2 + W_u(NH_{3in,k})^2 + W_{du}(\Delta RED_{in,k})^2 ] \right)$$

wherein $NO_{x,k}$ is the measured value of the nitrogen-oxides concentration, $NO_{x,ref}$ is the reference value of the nitrogen-oxides concentration, $NH_{3,k}$ is the measured value of the ammonia concentration, $NH_{3,ref}$ is the reference value of the ammonia concentration, $W_{NO_x}$ is a first weight factor, $W_{NH_3}$ is a second weight factor, $NH_{3in,k}$ is the quantity of the reductant to be calculated, $W_u$ is a third weight factor, $\Delta RED_{in,k}$ is the variation of the quantity of the reductant at each control cycle, $W_{du}$ is a fourth weight factor and N is a predetermined number of control cycles into a predetermined discrete-time prediction horizon.

5. The method of claim 4, further comprising determining the first weight factor, the second weight factor, the third weight factor, and the fourth weight factor of the quadratic performance index on the basis of a value of a temperature of exhaust gas entering the selective catalytic reduction system.

6. The method of claim 1, wherein the predetermined constraint conditions comprise a condition that the quantity of the reductant to be injected is within an interval ranging from zero to a maximum threshold value thereof.

7. The method of claim 1, wherein the predetermined constraint conditions comprise the condition that the first difference is within an interval ranging from zero to a maximum threshold value thereof.

8. The method of claim 1, wherein the predetermined constraint conditions comprise the condition that the second difference is within an interval ranging from zero to a maximum threshold value thereof.

9. The method of claim 1, wherein the predetermined constraint conditions comprise the condition that a quantity of ammonia stored into the selective catalytic reduction system at each control cycle is within an interval ranging from a minimum threshold value to a maximum threshold value thereof.

10. A non-transitory computer readable medium for controlling an reductant injector for a selective catalytic reduction system in an exhaust gas aftertreatment system of an internal combustion engine comprising a computer program having program-code, which when executed on a processor, carries out the method according to claim 1.

11. An aftertreatment system for an exhaust gas of the internal combustion engine:
   a selective catalytic reduction system having a reductant injector; and
   an electronic control unit configured to:
      measure a value of nitrogen-oxide concentration in an exhaust gas downstream of the selective catalytic reduction system;

calculate a first difference between the measured value of nitrogen-oxide concentration and a first predetermined reference value;

measure a value of ammonia concentration in the exhaust gas downstream of the selective catalytic reduction system;

calculate a second difference between the measured value of the ammonia concentration and a second predetermined reference value;

calculate a quantity of reductant to be injected by the injector as a function of the first difference and second difference, the electronic control unit configured to calculate the quantity of reductant by:

solving an optimization control function based on the first difference and second difference, the optimization control function subjecting the first difference and second differences and the quantity of reductant to respective predetermined constraint conditions; and calculating a minimum value of a quadratic performance index subjected to predetermined constraint conditions, wherein the quantity of reductant is a manipulated variable of the quadratic performance index and the first difference and second difference are, respectively, a first and a second state quantity of the quadratic performance index; and control the injector using the calculated quantity for injecting a reductant into the selective catalytic reduction system.

12. The aftertreatment system of claim 11, wherein the quadratic performance index comprises a third state quantity determined by a variation of the quantity of reductant at each control cycle.

13. The aftertreatment system according to claim 12, wherein the predetermined constraint conditions comprise the condition that the variation of the quantity of the reductant at each control cycle is within an interval ranging from a minimum negative threshold value to a maximum positive threshold value thereof.

14. The aftertreatment system of claim 12, wherein the quadratic performance index is defined by the following equation:

$$J = \left( \sum_{k=0}^{N-1} [W_{NO_x}(NO_{x,k} - NO_{x,ref})^2 + W_{NH_3}(NH_{3,k} - NH_{3,ref})^2 + W_u(NH_{3in,k})^2 + W_{du}(\Delta RED_{in,k})^2] \right)$$

wherein $NO_{x,k}$ is the measured value of the nitrogen-oxides concentration, $NO_{x,ref}$ is the reference value of the nitrogen-oxides concentration, $NH_{3,k}$ is the measured value of the ammonia concentration, $NH_{3,ref}$ is the reference value of the ammonia concentration, $W_{NO_x}$ is a first weight factor, $W_{NH_3}$ is a second weight factor, $NH_{3in,k}$ is the quantity of the reductant to be calculated, $W_u$ is a third weight factor, $\Delta RED_{in,k}$ is the variation of the quantity of the reductant at each control cycle, $W_{du}$ is a fourth weight factor and N is a predetermined number of control cycles into a predetermined discrete-time prediction horizon.

15. The aftertreatment system of claim 14, further comprising determining the first weight factor, the second weight factor, the third weight factor, and the fourth weight factor of the quadratic performance index on the basis of a value of a temperature of exhaust gas entering the selective catalytic reduction system.

16. The aftertreatment system of claim 11, wherein the predetermined constraint conditions comprise a condition that the quantity of the reductant to be injected is within an interval ranging from zero to a maximum threshold value thereof.

17. The aftertreatment system of claim 11, wherein the predetermined constraint conditions comprise the condition that the first difference is within an interval ranging from zero to a maximum threshold value thereof.

18. The aftertreatment system of claim 11, wherein the predetermined constraint conditions comprise the condition that the second difference is within an interval ranging from zero to a maximum threshold value thereof.

19. The aftertreatment system of claim 11, wherein the predetermined constraint conditions comprise the condition that a quantity of ammonia stored into the selective catalytic reduction system at each control cycle is within an interval ranging from a minimum threshold value to a maximum threshold value thereof.

* * * * *